United States Patent Office 3,730,918
Patented May 1, 1973

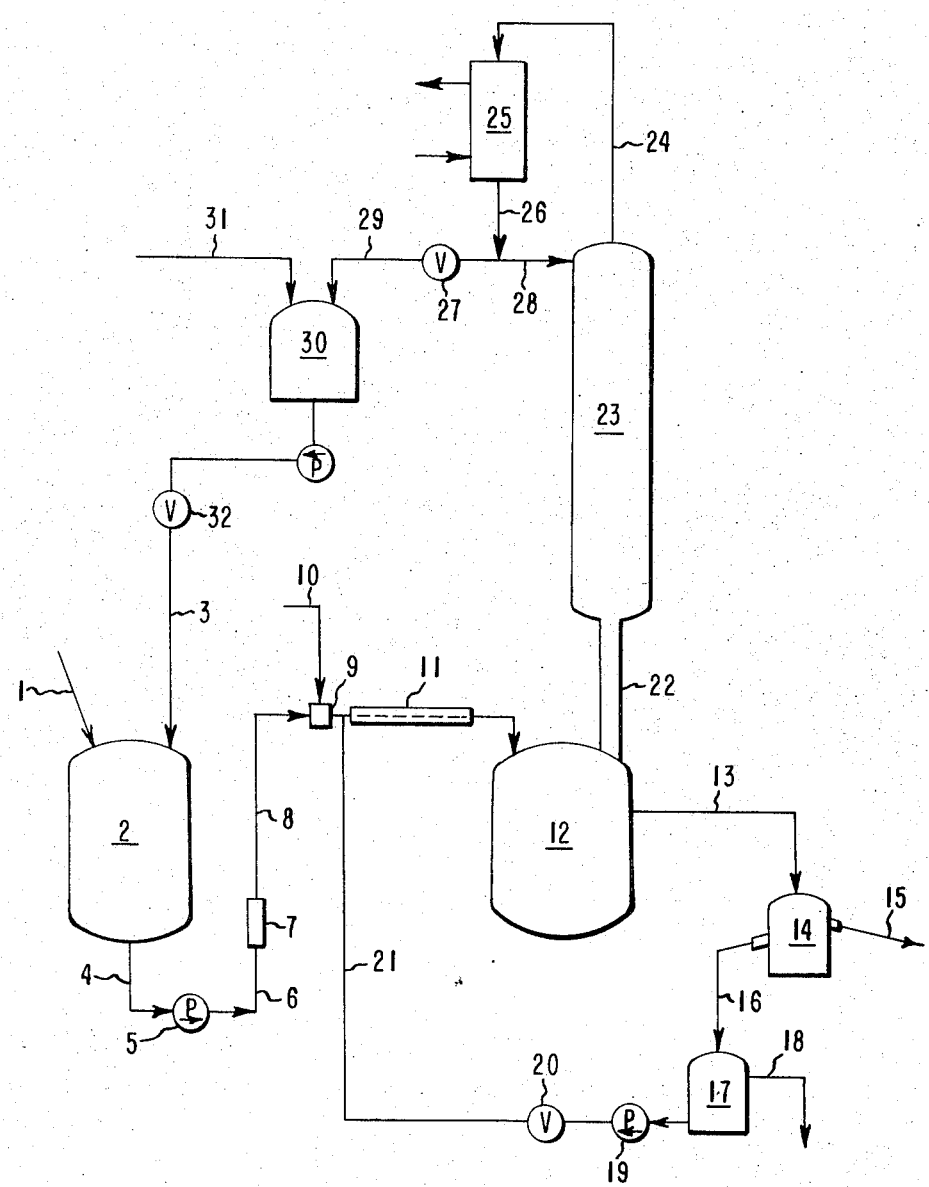

3,730,918
MICROPOROUS PARTICULATE THERMOPLASTIC
POLYMER COMPOSITION
John Teti, Wilmington, Del., and Jerome Carlton Violette, Freehold, N.J., assignors to E. I. du Pont de Nemours and Company, Wilmington, Del.
Filed June 10, 1971, Ser. No. 151,648
Int. Cl. C08j 1/26
U.S. Cl. 260—2.5 M
14 Claims

ABSTRACT OF THE DISCLOSURE

A microporous particulate thermoplastic polymer composition is prepared by mixing a thermoplastic polymer composition with hexafluoroisopropanol, contacting the mixture in a stream with a stream of steam whereby hexafluoroisopropanol is substantially instantly evaporated and the polymer composition is obtained as microporous particulate polymer composition. The polymer composition may be a thermoplastic polymer, a mixture of thermoplastic polymers, or thermoplastic polymer containing additives such as colorant composition, lubricants, plasticizers, stabilizers, etc. The microporous particulate polymer compositions are useful in compounding with additional polymer and in forming shaped polymer articles.

BACKGROUND OF THE INVENTION

(1) Field of the invention

This invention relates to a process for preparing a microporous particulate thermoplastic polymer composition. More specifically, this invention relates to a process for treatment of thermoplastic polymer compositions with hexafluoroisopropanol.

(2) Prior art

Thermoplastic polymers in finely divided solid form find extensive use in plastics processing industry. Finely divided thermoplastic polymers may be used for example in the molding and extrusion processes to form shaped objects. In the molding or the extrusion process, the thermoplastic polymers are melted during processing. The polymer in finely divided form is often desirable for ease of handling and of melting, particularly when the polymer is heat-sensitive. The thermoplastic polymers are generally compounded with additives such as colorants, plasticizers, ultra-violet absorbers, antioxidants, lubricants and the like to give the final product greater stability, increased usefulness and enhanced aesthetics.

Generally speaking, there are three methods of preparing finely divided thermoplastic polymers. The most common process is the comminution process wherein the bulk polymer is broken down into fine particles such as ball milling, grinding, pulverizing, dicing and the like. These mechanical processes require the thermoplastic polymer to possess a certain degree of brittleness, friability and low elongation. With many thermoplastic polymers noted for toughness and high elongation, such as polyamides, polyesters and polyacetals for example, considerable difficulty is experienced in forming finely divided polymer particles by the above mechanical procedures. With these thermoplastic polymers such comminution operations must often be carried out at considerably reduced temperatures, such as the temperature of Dry Ice (—78° C.) or even that of liquid nitrogen (—196° C.) in order to increase the brittleness of the polymer.

The second general method of producing finely divided thermoplastic polymer is to obtain the polymer particles directly from the polymerization step. In the emulsion polymerization process, the polymer formed is usually in a finely divided discrete form and thus may be recovered as finely divided polymer particles by separating the polymer from the liquid phase, such as by spray drying the emulsion. However, the preparation of finely divided polymer from the polymerization step is limited to those polymers which are preparable by emulsion polymerization process. Usually the addition-type polymers such as those prepared from vinyl monomers (e.g. polyvinylchloride, polystyrene, polyvinylidene dichloride and the like) are prepared in emulsion form while those polymers which are considered to be condensation-type polymers (e.g. polyamides, polyesters) are not prepared in emulsion.

The third general procedure for preparing thermoplastic polymers in finely divided form is by solution precipitation. Such process may involve mixing a solution of a polymer with a second liquid component which is usually soluble in or miscible with the polymer solvent but which is not a solvent for the polymer and precipitation in a finely divided form. Solution precipitation process may also be carried out by using only one liquid component which is a latent solvent for the polymer. By latent solvent is meant a liquid which is a non-solvent for the polymer at low or ordinary temperatures but is a solvent for the polymer at elevated temperatures. Thus by heating a mixture of a polymer with a latent solvent to elevated temperatures, a solution of the polymer is obtained, which when cooled to lower temperatures often cause the polymer to separate as finely divided particles. The solution precipitation procedure for the preparation of the polymer in finely divided form is limited to these polymers which have sufficiently high solubility in solvents. Many polymers such as polyamides, polyacrylonitriles, polyesters and polyacetals are insoluble or are of very limited solubility in most organic solvents.

An objective of this invention is to provide microporous particulate thermoplastic polymer compositions. Another object of this invention is to provide a novel process for producing microporous particulate thermoplastic polymer compositions. Still another object of this invention is to provide a process for producing a microporous particulate thermoplastic polymer composition by treatment of the polymer compositions. These and other objectives of this invention will be apparent from the disclosures which follow.

SUMMARY OF THE INVENTION

Now in accordance with the invention a process has been discovered for producing a microporous particulate thermoplastic polymer composition which comprises:

(a) Mixing a thermoplastic polymer composition, wherein the thermoplastic polymer component of said thermoplastic polymer composition has a solubility of at least 1 weight percent in hexafluoroisopropanol and is further characterized as insoluble in water, with hexafluoroisopropanol, (b) Contacting a stream of said mixture of thermoplastic polymer composition and hexafluoroisopropanol with a stream of steam, said steam being at a pressure of about 15 to about 135 pounds per square inch absolute whereby the polymer composition is obtained as microporous particulate polymer composition and hexafluoroisopropanol is substantially instantly evaporated, (c) Adding further liquid water and maintaining the resulting mixture at 60° to 100° C. until residual hexafluoroisopropanol has evaporated, and (d) Recovering the microporous particulate thermoplastic polymer composition.

Accordingly, a microporous particulate thermoplastic polymer composition is prepared by (a) Mixing a thermoplastic polymer composition selected from the group consisting of polyamides, polyesters, polyacrylonitriles and polyacetals, wherein the thermoplastic polymer composition has a solubility of at least 1 weight percent in hexafluoroisopropanol and is further characterized as insoluble in water, with hexafluoroisopropanol, (b) Contacting a stream of said mixture of thermoplastic polymer composition and hexafluoroisopropanol in a stream with a stream of steam, said stream being at a pressure of about 15 to about 135 pounds per square inch absolute, whereby the polymer composition is obtained as microporous particulate polymer composition and hexafluoroisopropanol is substantially instantly evaporated, (c) Adding further liquid water and maintaining the resulting mixture at 60° to 100° C. until the residual hexafluoroisopropanol has evaporated and (d) Recovering the microporous particulate thermoplastic polymer composition.

In the context of the present invention, a microporous particulate thermoplastic polymer composition is a thermoplastic polymer composition in finely divided form wherein the particle size is in the range of about 10 to about 200 microns and wherein each particle contains therein, interconnecting capillary pores whose pore diameters are in the range of about 0.1 to about 1.5 microns. By thermoplastic polymer composition is meant a normally solid thermoplastic polymer, a mixture of normally solid thermoplastic polymers, a normally solid thermoplastic polymer containing additives or a mixture of normally solid thermoplastic polymers containing additives. The thermoplastic polymers of this invention are well known in the art and may include such polymers as polyacrylics, (polymethacrylates, polyacrylates), cellulosics (cellulose acetate, cellulose propionate), polyurethanes, vinyls (polyvinyl acetate, polyvinyl chloride, polyvinylidene chloride), polyamides, polyacrylonitriles, polyesters and polyacetals.

Thermoplastic polymers are used often in applications with other ingredients which may be termed additives. In the context of this invention additive is used to designate any matrial added to the thermoplastic polymer to confer desirable properties such as the modification of the polymer characteristics, the enhanced stability, the ease of processing, the aesthetic appearance and the like. Additives include plasticizers, colorant compositions, lubribants, antioxidants, ultra-violet stabilizers, flame retardants, etc. In the plastics industry, the process of mixing desired additives with the polymer resin is known as compounding, and the compounding process is recognized as a difficult process. Thus in "A Concise Guide to Plastics" by H. R. Simonds and J. M. Church, 2nd edition, Reinhold Publishing Corp., N.Y., 1963, p. 150, first paragraph, it is stated ". . . the process by which the final plastics mixture is made is known as compounding. This consists of a method whereby the ingredients are intimately mixed together into as nearly a homogeneous mass as is possible. However, this represents a most difficult problem because of the viscous nature of both the resinous materials and of the other ingredients involved. The wide range of mixes from slurries, pastes, doughy consistencies and the like requiring methods of mixing which include dispersion, kneading, masticating and similar mixing operation make this one of the most complicated processes of the plastics industry." Again on page 156, second paragraph of the same reference, "The essential problem in compounding is that of completely mixing the ingredients which go into the plastics mix. Since most of the materials are solids and viscous liquids, their intermixing is one of the most difficult operations known."

The shape of the particulate matter depends upon the method of preparation and upon the nature of the solid material used in the preparation of particles. Using the designation often used in Powder Metallurgy (cf. "Encyclopedia of Chemical Technology" Kirk-Othmer, 2nd edition, Interscience Publishers, volume 16, p. 101) the shape of a particle may be considered to be spherical, rounded, angular, acicular, irregular, porous or fragmented. For many polymer processing operations which depend upon the formation of molten polymer, such as in molding and extrusion, the particular shapes of the polymer particles are of secondary importance except for the possible ease of melting where heat-sensitive thermoplastic polymers are involved. In many other operations, however, the shapes of the polymer particles are of considerable importance. For example, in forming shaped polymer articles by pressing in a method comparable to powder metallurgy technology used to form shaped porous articles, the shapes of the particles are of importance in conferring strength to the shaped articles. During pressing of the particles to form a coherent mass, the integral mass is produced through the processes of interparticle binding and interlocking. Thus particles consisting of spherical or rounded particles when pressed together form a coherent mass which is held together predominantly by interparticle binding, while the pressing of irregularly shaped particles form a coherent mass held together by both interparticle binding and interlocking of particles.

The mechanical comminution processes generally yield particles which may be rounded, angular, irregular or fragmented. Particles isolated by coagulation from emulsion polymerization polymers are generally spherical or rounded and particles prepared by precipitation from solution polymers may be rounded, acicular or irregular. In the process of this invention, the microporous particulate thermoplastic polymer compositions comprise irregularly shaped particles whose particles size is in the range of about 10 to about 200 microns and wherein interconnecting capillary pores of diameters in the range of about 0.1 to about 1.5 microns are present therein. Thus the particulate thermoplastic polymer compositions of this invention are advantageously used to form shaped articles, the irregular shaped particles conferring strength to the shaped article.

The invention may be better understood by reference to the figure which repersents a flow diagram of the process used to prepare the microporous particulate thermoplastic polymer composition of the invention.

Referring now to the figure, the thermoplastic polymer composition is introduced via line 1 into a tank 2 equipped with adequate agitation means. Hexafluoroisopropanol is introduced via line 3 into tank 2 through valve 32. When the thermoplastic polymer composition consists of a thermoplastic polymer or a mixture of thermoplastic polymers and when the additive present with the thermoplastic polymer is soluble in hexafluoroisopropanol, a solution is obtained. When the additive is insoluble in hexafluoroisopropanol, a mixture wherein the additive is uniformly distributed in the polymer solution is obtained. Uniform distribution of insoluble additive is assured by fine subdivision of the additive, viscous nature of the polymer solution and the presence of agitation. Thus a mixture of thermoplastic polymer composition with hexafluoroisopropanol may be a solution or a solution of polymer in hexafluoroisopropanol with the hexafluoroisopropanol-insoluble component of the thermoplastic polymer composition distributed uniformly therein. The thermoplastic polymer composition mixture with hexafluoroisopropanol is taken via line 4 to pump 5 and thence into filter 7 via line 6. Of course, when the thermoplastic polymer composition mixture with hexafluroisopropanol contains as a component of the composition, additives which are insoluble in hexafluoroisopropanol, filter 7 is not used. The mixture is taken via line 8 into a two-fluid mixing nozzle 9 wherein the mixture is contacted with steam introduced via line 10. The volatilized hexafluoroisopropanol and the microporous particulate thermoplastic polymer composition stream from the nozzle 9 are mixed with water introduced via line 21 in stripper tube 11 and thence into tank 12. From tank 12 the microporous particulate thermoplastic polymer composition is taken via line 13 into a separator 14. The separated microporous particulate thermoplastic polymer composition is then taken via line 15 for further processing, such as drying. The vaporized hexafluoroisopropanol is taken from the tank 12 via line 22 to a distillation column 23 and thence to a condenser 25 via line 24. The condensed hexafluoroisopropanol is recycled to to the distillation column 23 if of insufficient purity via lines 26 and 28. Hexafluoroisopropanol of sufficient purity is taken from 25 through valve 27 and line 29 to the storage tank 30. Any make-up hexafluoroisopropanol required is added via line 31. The water separated in the separator 14 is taken via line 16 to a recycle water storage tank 17 from which it is recycled via pump 19 and valve 20 through line 21 to the stripper tube 11. Water in excess of that required in the process is removed from the recycle water storage tank via line 18.

The thermoplastic polymer compositions of the present invention are first mixed with hexafluoroisopropanol. When the polymer composition is a thermoplastic polymer or a mixture of thermoplastic polymers, a solution of polymer or polymers is hexafluoroisopropanol is obtained. Generally the weight ratio of the polymer to hexafluoroisopropanol is in the range of about 5 to 30 parts of polymer to 70 to 95 parts of hexafluoroisopropanol. Although the polymer to hexafluoroisopropanol ratio is greater than 30:70 will give polymer solutions, generally the viscosity of the resultant polymer solution becomes too high for practical handling. A polymer to hexafluoroisopropanol ratio of less than about 1:99 results in less economical process because of the necessity of handling and recovering excesive amounts of the solvent. Polymer to hexafluoroisopropanol used may be substantially pure hexafluoroisopropanol but hexafluoroisopropanol containing up to about 10% by weight of other liquids such as water, alcohol and the like are useable. The preferred hexafluoroisopropanol has at least 95% hexafluoroisopropanol. Usually the mixing of the polymer composition with hexafluoroisopropanol is carried out at ambient temperature, but if desired, mixing may be carried out at slightly elevated temperature such as 40° C. to about 59° C. The thermoplastic polymer composition may contain in addition to the thermoplastic polymer, certain additives which provide desired properties in the finished polymer articles. These additives may be plasticizers, colorant compositions, stabilizers, lubricants and the like. When these additives are soluble in hexafluoroisopropanol, a solution of the thermoplastic polymer and the additives in hexafluoroisopropanol is obtained. When the additive is insoluble in hexafluoroisopropanol, there is obtained a solution of polymer in hexafluoroisopropanol with insoluble additive uniformly distributed therein. Many dyes, plasticizers, lubricants, antioxidants, and ultra-violet absorbers are soluble in hexafluoroisopropanol while most pigments, both organic and inorganic, are insoluble. The amount of additive present depends upon the intended use of the particulate thermoplastic compositions. If the composition is to be used directly, the amount of the additive is usually in the range of about 0.05% to about 5% by weight based on the weight of the polymer. However, if the composition is to be compounded further with additional polymer, such as for example addition of the composition containing colorant composition to the polymer to be melt processed to prepare colored shaped objects, the amount of additive may be in the range of about 0.5% to about 60% by weight based on the weight of the polymer. The additives that may be used in the composition of the present invention include as colorant composition, dyes such as azo, anthraquinone, vat, sulfur, basic and the like; organic pigments such as azo, anthraquinone, thioindigo, phthalocyanine, quinacridone and the like; inorganic pigments such as red iron oxides, brown iron oxides, black iron oxides, chromium oxides, lead oxides, lead chromates, zinc chromates, lead molybdates, cadmium sulfide, cadmium selenide, titanium dioxide, zinc oxide and the like; plasticizers such as di-2-ethyl-hexylphthalates, dioctyl phthalate, di-2-ethylhexyl sebacate, dioctyl sebacate, di-2-ethylhexyladipate, diocetyl adipate, di-2-ethylhexyl azelate, dioctyl azelate, tricresylphosphate, 2-ethylhexyl-diphenyl phosphate, N-ethyltoluene sulfonamide, N,N-dicyanoethyltoluenesulfonamide and the like; lubricants such as sodium stearate, potassium stearate, calcium stearate, zinc stearate, waxes, fatty alcohols, fatty amides, fatty ketones and the like; antioxidants such as 2,6-di-tertiary butyl - p - cresol, 2,2'-methylene bis(4-methyl-6-tert.-butylphenol), 4,4' - methylene bis(2,6 - di-tert.butylphenol), di-lauryl thiopropionate, 2-mercapto benzothiazole, phenothiazine and the like; ultra-violet stabilizers such as 2,4-di-hydroxybenzophenone, 2-hydroxy-4-n-octyloxybenzophenone, 2-hydroxy-4-dodecyloxybenzophenone, 2,2'-di-hydroxy-4-n-octyloxybenzophenone, 5-chloro-2-(2'-hydroxy - 3',5' - di-tert.-butylphenyl)benzotriazole, 2-(2'-aminophenyl)benzotriazole and the like; flame retardant such as tris(2,3-di-bromoalkyl)phosphate, hexabromobenzene and the like.

Those additives which are insoluble in hexafluoroisopropanol should preferably be in finely divided state to insure uniform distribution in the polymer solution. Art-known processes of comminution such as grinding, ball milling, may be used to produce finely divided additives. The particle size should be in the range of about 0.1 to about 3 microns, the preferred particles size being in the range of 0.1 to about 1 micron.

The mixing of the thermoplastic polymer composition with hexafluoroisopropanol is carried out preferably at ambient temperatures but, if desired to hasten the dissolution of the polymer, a slightly elevated temperature such as 40° to about 59° C. may be used. One of the important features of this invention is that the thermoplastic polymers may be dissolved in hexafluoroisopropanol at relatively low temperature thus avoiding oxidative or thermal degradation of the polymer.

In the next step of the process, which constitutes the inventive method of separating the thermoplastic polymer composition from the hexafluoroisopropanol in the form of a microporous particulate thermoplastic composition, a stream of the mixture of polymer composition with hexafluoroisopropanol wherein the thermoplastic polymer component of said thermoplastic polymer composition has a solubility of at least 1 weight percent in hexafluoroisopropanol and is further characterized as insoluble in water, is contacted with a stream of steam. The contact is preferably achieved in a two-fluid mixing nozzle. Hexafluoroisopropanol is substantially instantly evaporated and the thermoplastic polymer composition is obtained as microporous particulate thermoplastic polymer composition of fairly uniform size and porosity. It is understood that in the term "two-fluid," the mixture of polymer composition with hexafluoroisopropanol is one of the fluids while the second fluid is steam which may or may not be mixed with water. The pressure of the steam entering the two-fluid nozzle should be in the range of from about 15 to about 135 pounds per square inch, absolute (p.s.i.a.). Steam pressure below about 15 p.s.i.a. produce polymer composition whose particle size is undesirably large while steam pressure greater than about 135 p.s.i.a. serve no further useful purpose.

It is understood that the steam pressures discussed above are used to indicate temperatures of saturated steam. Thus, saturated steam at 15 p.s.i.a. (0 pounds per square inch gauge [p.s.i.g.]) has a temperature of 100° C. while saturated steam at 135 p.s.i.a. (120 p.s.i.g.) has a temperature of 176.7° C. It is therefore possible to use superheated steam of lower pressures provided that the temperature range of the steam is in the range of 100° C. to 176.7° C.

As may be expected, the particle size and the pore diameter of the polymer composition depend upon the concentration of the polymer in solution, steam pressure and the degree of subdivision of the polymer solution in the nozzle. Large particles and pore diameters are obtained with higher concentration of the polymer in solution coupled with low steam pressure while smaller particles and pore diameters are obtained with lower concentration of the polymer in solution coupled with high steam pressure. Generally, when the polymer concentration is around 6–10%, based on the weight of hexafluoroisopropanol and the steam pressure is around 65–85 p.s.i.a., the particles size in the range of from about 20 to about 50 microns and pore diameters of about 0.2 to about 1 micron are obtained.

The effluent from the two-fluid nozzle comprising volatilized hexafluoroisopropanol, microporous particulate polymer composition, and water is mixed with further amount of water in a stripping tube and introduced into a stripping vessel containing water in the temperature range of 60° to 100° C. In the agitated stripping vessel, a further amount of hexafluoroisopropanol is removed from the microporous particulate polymer composition. The temperature of the water should be higher than 60° C. to volatilize hexafluoroisopropanol (B.P. 59° C.) and is preferably around 100° C. The temperature of the water may be maintained by such means as an external heating jacket, internal heating coils or by spraying steam into the water bath. It is preferable to maintain the water temperature at about 100° C., not only to improve volatilization of hexafluoroisopropanol from the particulate thermoplastic polymer composition, but also to minimize the loss of hexafluoroisopropanol by solution in water. By maintaining the water at around 100° C., the water will contain less than 0.3% by weight, usually less than 0.1% by weight, of hexafluoroisopropanol.

The volatilized hexafluoroisopropanol is recovered from the stripping vessel by fractionation in a distillation column and then recycled. While most of the solvent is volatilized in the two-fluid mixing nozzle and the stripper tube, maintaining the water in the stripping vessel at around 100° C. assures substantially complete volatilization of hexafluoroisopropanol.

The microporous particulate thermoplastic polymer composition is then taken from the stripping vessel, and water is separated from the polymer composition by any conventional means such as filtration, centrifugation and the like. The separate water is recycled in the process back to the stripper tube wherein it is mixed with the effluent from the two-fluid nozzle. The separated microporous particulate polymer composition may be further processed, such as drying.

It is clear from the foregoing description of the process for the preparation of the microporous particulate thermoplastic polymer composition of this invention that the thermoplastic polymer treated should be normally solid and soluble in hexafluoroisopropanol and additionally should be insoluble in water. Solubility in hexafluoroisopropanol is necessary since the production of the composition of the present invention is dependent upon dissolution of the polymer in hexafluoroisopropanol and the subsequent removal of the polymer solvent to provide the microporous particulate compositions. If the thermoplastic polymer were highly soluble in water, as for example polyvinyl alcohol which is also soluble in hexafluoroisopropanol, the composition of the invention is not obtained by the process because of the leaching of the polyvinyl alcohol by water. Thermoplastic polymer solubility in hexafluoroisopropanol of at least 1 weight percent is desired; otherwise the economics of the process becomes prohibitively expensive.

The thermoplastic polymers useful in the preparation of the composition of this invention are well known in the art and comprise linear polymers characterized by the presence in the polymer of polar group or groupings which contribute to their solubility in hexafluoroisopropanol. Such thermoplastic polymer are polyacrylics (polymethacrylates, polyacrylates), cellulosics (cellulose acetate, cellulose propionate), polyurethane, polyvinyls (polyvinyl acetate, polyvinyl chloride, polyvinylidene chloride), polyamides, polyacrylonitriles, polyesters, and polyacetals. Those thermoplastic polymers which are of low solubility in hexafluoroisopropanol (less than about 1%) such as polyethylene, polypropylene or polystyrene and those thermoplastic polymers which, even though highly soluble in hexafluoroisopropanol, are also highly soluble in water, such as polyvinyl alcohol, are not useful in the preparation of the composition of this invention. Particularly desirable microporous particulate thermoplastic compositions are those obtained from polyamides, polyacrylonitriles, polyesters and polyacetals since these polymers are relatively expensive, are difficult to obtain in finely divided form and offer difficulty in compounding.

A polyamide is defined as a synthetic, linear condensation-type polymer whose repeating units contain the amide group

these groups being integral members of the linear polymeric chain. Polymers of this type are well known in the art. Polyamides may be derived from dibasic acids such as oxalic, succinic, adipic, suberic, and sebacic acids and diamines such as ethylenediamine, pentamethylenediamine, hexamethylenediamine, decamethylenediamine, tetradecamethylenediamine, and di(p-aminocyclohexyl)-methane. Polyamides may also contain one or more aromatic groups either in their acid portion or their amine portions as, for example, in poly(p-phenylene terephthalamide) or poly(m-phenylene isophthalamide). Polyamides may also be derived from monoaminomonocarboxylic acids or their cyclic lactams, typical examples being polycaprolactam or poly(aminodecanoic acid). Polyamides as used herein include copolymers containing repeating units of two or more different kinds such as for example those present in copolyesteramides or copolyamide urethanes provided that at least two-thirds of the repeating units are the above-defined amide linkage

Other representative examples include poly(pentamethylene adipamide),
poly(octamethylene adipamide),
poly(decamethylene adipamide),
poly(pentamethylene suberamide),
poly(hexamethylene suberamide),
poly(decamethylene suberamide),
poly(pentamethylene sebacamide),
poly(hexamethylene sebacamide),
poly(octamethylene sebacamide),
poly(caproamide),
poly(hexamethylene adipamide),
poly[bis-(p-cyclohexylene)methane adipamide],
poly[bis(para-cyclohexylene)-methane azelamide],
poly(pentamethylene terephthalamide),
poly(hexamethylene terephthalamide),
poly(m-phenylene adipamide),
poly(p-phenylene adipamide), etc.

A polyester is defined as synthetic linear condensation-type polymer whose repeating units contain the ester group,

these groups being integral members of the linear polymer chain. Polyesters are also well known in the art. Polyesters may be those derived from aliphatic dibasic acids such as oxalic, succinic, glutaric, adipic, and sebacic acids and glycols such as ethylene glycol, propylene glycol, trimethylene glycol, hexamethylene glycol and decamethylene glycol. Polyesters may also be derived from aromatic dicarboxylic acids such as terephthalic acid and isophthalic acid and glycols such as ethylene glycol. Polyesters may also be derived from hydroxy acids and their corresponding lactones such as those from hydroxypivalic acid, α-hydroxyisobutyric acid, ω-hydroxycaproic acid, ω-hydroxydecanoic acid, γ-butyrolactone and 4-hydroxylexanoic acid lactone. Polyesters as used herein include copolymers containing repeating units of two or more different kinds such as in copolyesteramide provided that at least two-thirds of the repeating units are the above-defined ester linkages

Representative examples include poly(ethylene terephthalate),
poly(trimethylene terephthalate),
poly(tetramethylene terephthalate),
poly(ethylene-isophthalate),
poly(octamethylene terephthalate),
poly(decamethylene terephthalate),
poly(pentamethylene isophthalate),
poly(tetramethylene isophthalate),
poly(hexamethylene isophthalates),
poly(hexamethylene adipate),
poly(pentamethylene adipate),
poly(pentamethylene sebacate),
poly(hexamethylene sebacate),
poly(1,4-cyclohexylene adipate),
poly(1,4-cyclohexylene sebacate),
poly(ethylene terephthalate-co-sebacate)
and poly(ethylene-co-tetramethylene terephthalate).

A polyacrylonitrile is defined as a linear addition-type polymer containing at least 85% by weight of polymerized acrylonitrile. Such polyacrylonitriles include in addition to the polyacrylonitrile homopolymer, acrylonitrile copolymers wherein at most 15% by weight of the polymers comprise esters, nitriles and amides of acrylic and 1-alkylacrylic acid such as methyl methacrylate, methyl acrylate, ethyl acrylate, methacrylonitrile, acrylamide, butyl methacrylate butyl acrylate; chloro- and fluoroolefins such as vinyl chloride, vinyl fluoride, vinylidene chloride, vinylidene fluoride, chlorotrifluoroethylene, tetrafluoroethylene; vinyl carboxylates such as vinyl acetates or vinyl butyrate; ethylenically unsaturated hydrocarbons such as styrene, isobutylene or 1,3-butadiene; ethylenically unsaturated carboxylic or sulfonic acid such as acrylic acid, methacrylic acid or styrenesulfonic acid.

A polyacetal is defined as synthetic, high molecular weight, linear polymer containing acetal oxygen as integral part of the linear polymeric chain. These polymers are characterized by the presence of the repeating acetal unit

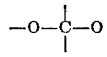

Polyoxymethylene, a polyformaldehyde and particularly polyoxymethylene stabilized by acylation of the terminal hydroxyl groups are well known. Polyacetals as used herein include not only polymers containing solely acetal units but also polymers containing different repeating units provided that at least two-thirds of the repeating units are acetal units. Representative examples include poly(formaldehyde), poly(acetaldehyde), poly(propionaldehyde), poly(butyrlaldehyde), poly(benzaldehyde) and poly(chloral).

The process for the preparation of the microporous particulate thermoplastic polymer compositions of this invention depend upon the processes of dissolution of the thermoplastic polymer in a solvent and the subsequent facile removal of the solvent to leave behind microporous particulate thermoplastic polymer composition. Thus the solvent must be a good solvent for the normally solid thermoplastic polymers, particularly for polyamides, polyesters, polyacrylonitriles and polyacetals, and moreover should be a solvent for a mixture of thermoplastic polymers such as, for example, a mixture of a polyamide and a polyester. Finally, the solvent must be easily removed. Polyamides are known to dissolve in formic acid (B.P. 100.7° C.), cresols (B.P. 191.5–202.5° C.), and phenol (B.P. 182° C.). Polyester such as poly(ethylene terephthalate) is soluble in such solvents as m-cresol (B.P. 202.8° C.), trifluoroacetic acid (B.P. 73° C.) o-chlorophenol (B.P. 176° C.), a mixture of three parts of trichlorophenol (B.P. 244° C.) and ten parts phenol (B.P. 182° C.) and a mixture of two parts tetra-chloroethane (B.P. 146° C.) and three parts phenol (B.P. 182° C.). Polyacrylonitrile is soluble in N,N-dimethylformamide (B.P. 153° C.), N,N-dimethylacetamide (B.P. 166° C.), dimethylsulfone (B.P. 238° C.), dimethylsulfoxide (B.P. 100° C. with decomp.) γ-butyrolactone (B.P. 206° C.) and nitrophenols (B.P. 214–280° C.). Availability of solvent for polyacetals is even more limited. As the following table from "Encyclopedia of Polymer Science and Technology," Interscience Publishers, N.Y., 1964, vol. 1, p. 619, shows, fairly elevated temperatures are required to dissolve the polymer and to maintain the polymer solutions for poly(oxymethylene). In the table "Solution Temperature" is the lowest temperature at which 1% solution of the polymer can be formed and the "Gel Temperature" is the lowest temperature at which a solution can be kept without separation of gel.

| Solvent | Solution temp., °C. | Gel temp., °C. |
| --- | --- | --- |
| m-Chlorophenol (B.P. 214 C.) | 89 | 55 |
| Phenol (B.P. 182 C.) | 109 | 58 |
| p-Chlorophenol (B.P. 217° C.) | 98 | 60 |
| 2,4-xylenol (B.P. 211.5° C.) | 128 | 88 |
| Aniline (B.P. 184.4° C.) | 130 | 102 |
| γ-butyrolactone (B.P. 206 C.) | 134 | 112 |
| N,N-dimethylformamide (B.P. 153 C.) | 135 | 115 |
| Pentachloroethane (B.P. 162° C.) | 140 | 117 |
| Benzyl alcohol (B.P. 205.2° C.) | 132 | 119 |
| Formamide (B.P. 210.9° C.) | 150 | 130 |
| Nitrobenzene (B.P. 210.9° C.) | 148 | 134 |
| Cyclohexanol (B.P. 161.5° C.) | 150 | 140 |
| Propionic anhydride (B.P. 169.3° C.) | 155 | 144 |

The solvents for polyamides, polyesters, polyacrylonitriles and polyacetals discussed above have the deficiencies of low polymer solubility, incapability of dissolving many mixtures of polymers and difficulty in removal from the polymer solution as indicated by their boiling points. When prolonged heating is required either in dissolving the polymer or in removing the solvent from the polymer solution, the possibility of oxidative or thermal degradation of the polymer is introduced.

Hexafluoroisopropanol, (CF₃)₂CHOH, has recently become available through catalytic hydrogenation of hexafluoroacetone as described by Middleton in U.S. 3,418,337 or by the improved hydrogenation process of copending application of Lee, Ser. No. 811,668, filed Mar. 23, 1969, assigned to the common assignee. Hexafluoroisopropanol is a water white liquid of M.P. −3.4° C., B.P. 59° C., $n_D$ 1.2752, specific gravity of 1.59, surface tension of 16.3 dynes/cm. at 25° C. and which is very soluble in water. Compositions comprising polyacetals, polyamides, polyesters and secondary and/or tertiary polyhaloalcohols are described in U.S. Pats. 3,227,674 and 3,245,944. Most of the polyhaloalcohols disclosed in the above patents are good solvents for polyamides, polyesters and polyacetals but are not good solvents for the preparation of the compositions of the present invention because of the relatively high boiling points.

The microporous particulate thermoplastic polymer composition of the present invention are useful in applications wherein polymer particles are desirably used. Such applications may be in the usual thermoplastic polymer processing such as in molding and extrusion; in further compounding with other ingredients; in mixing with molten thermoplastic polymer, such as for example the addition of microporous particulate thermoplastic polymer composition containing colorant composition to provide colored polymer composition which is then used to prepare formed articles; in forming porous coherent formed articles by the techniques of powder metallurgy (pressing and sintering) to formed articles such as gears, bearings, filters and the like.

The following examples further illustrate the invention.

EXAMPLE 1

Microporous particulate polyamide was prepared in an apparatus designed to process about 0.45 to 0.67 kg. (1–1½ lbs.) of polymer composition per hour. The apparatus used was essentially as shown in the figure. A 20% solution of polyamide (Nylon 66, polyhexamethylene adipamide) was prepared in tank 2 from 0.9 kg. (2 lbs.) of polyamide and 3.63 kg. (8 lbs.) of hexafluoroisopropanol of 95% purity (5% water). The polyamide solution was readily prepared at ambient temperature. The polymer solution was pumped through a filter and into a two-fluid nozzle 9 at 25° C. at the rate of approximately 40–50 ml. per minute where the polymer solution was contacted with steam at 70 p.s.i.g. (150° C.) introduced at the rate of 0.9 kg./minute. The effluent from the two-fluid nozzle was mixed with water in the stripper tube 11, the water being at a temperature of around 99° C. and introduced at the rate of 1.7 kg. (3.8 lbs.) per minute. From the stripper tube the effluent was collected in an agitated stripping vessel 12 containing water at about 99°–100° C. The microporous particulate polyamide and water were taken from the stripper vessel at the water flow rate of 1.87 kg. (4.15 lbs.) per minute. The temperature of the water was 99° C. The polymer particles were separated from the water on a dewatering screen and dried in an oven at 105°–110° C. Microscopic examination of the polyamide particles thus obtained showed particle size in the range of about 40 to 100 microns with pore diameter in the range of about 0.5 to 2 microns.

EXAMPLE 2

The procedure of Example 1 was followed except that a 7% solution of polyethylene terephthalate in hexafluoroisopropanol was used to obtain microporous particulate polyethylene terephthalate. Microscopic examination of the polyethylene terephthalate particles thus obtained showed particle size in the range of 20 to 50 microns with pore diameters in the range of about 0.3 to 1 micron.

EXAMPLE 3

Using the procedure described in Example 1 with the exception that polyacrylonitrile was used, the polymer concentration amounting to 7% in hexafluoroisopropanol, microporous polyacrylonitrile was obtained. Microscopic examination of the polyacrylonitrile particles thus obtained showed particle size in the range of 30 to 70 microns with pore diameters in the range of about 0.4 to 1.2 microns.

EXAMPLE 4

Using the procedure described in Example 1 with the exception that polyoxymethylene was used, the polymer concentration amounting to 7% in hexafluoroisopropanol, microporous polyoxymethylene was obtained. Microscopic examination of the polyoxymethylene particles thus obtained showed particle size in the range of 20 to 50 microns with pore diameters in the range of about 0.3 to 1 micron.

EXAMPLE 5

Using the procedure described in Example 1, a mixture of polyhexamethylene adipamide (60%) and polyethylene terephthalate (40%) was used to prepare mixed microporous particulate polymer composition.

EXAMPLE 6

The preparation of microporous particulate thermoplastic polymer composition which contains a colorant composition is illustrated in this example. Blue phthalocyanine pigment 3.4 kg. (7.5 lbs.), polyethylene terephthalate 0.34 kg. (0.75 lb.) and hexafluoroisopropanol 0.98 kg. (21.6 lbs.) were added to a jar mill. The jar mill was operated for 24 hours, after which time the average pigment size was 0.15 micron. The pigment dispersion was transferred to the tank 2 (figure) along with additional 9.5 kg. (20.9 lbs.) of hexafluoroisopropanol. With the agitation on, an additional 1.25 kg. (2.75 lbs.) of polyethylene terephthalate was added to the tank 2. The mixture in the tank was agitated for 16 hours at ambient temperature to insure complete solution of the polymer. The dispersion of the pigment in hexafluoroisopropanol solution of polyethylene terephthalate was then pumped to the two-fluid nozzle at the rate of about 40–50 ml. per minute where the dispersion was contacted with steam at a pressure of 70 p.s.i.g. introduced at the rate equivalent to about 0.9 kg. per minute. The effluent from the two-fluid nozzle was then mixed with water in the stripper tube, the water being introduced at the rate of about 1.7 kg. per minute at the temperature of about 99° C. From the stripper tube the effluent was collected in the agitated stripper vessel containing water at about 99° C. The microporous particulate polyester composition and water were taken from the stripper vessel at the water flow rate of about 1.8 kg. (4.15 lbs.) per minute. The particulate polyester composition was separated from the gross water on a dewatering screen and dried at 110°–120° C. The particulate polyester composition had particle size in the range of 30 to 60 microns with pore diameters in the range of 0.3 to 1 micron, with pigment particles of average particle size of 0.15 micron distributed uniformly therein. The pigment content of the particulate composition was 40% (by weight) and the composition had uniform blue color.

EXAMPLE 7

Following the procedure described in Example 6, microporous particulate polyethylene terephthalate compositions were prepared containing the following additives: violet phthalocyanine pigment; scarlet phthalocyanine pigment; green phthalocyanine pigment; gold phthalocyanine pigment; yellow lead chromate pigment; orange basic lead chromate pigment; carbon black pigment; brown basic dye; green anthraquinone dye; yellow acid dye, red acid dye; cupric stearate; manganous hypophosphite; and hexabromobenzene. Similarly, microporous particulate polyamide or polyacrylonitrile compositions containing similar additives can be prepared.

EXAMPLE 8

The colored polyethylene terephthalate compositions containing pigments prepared in Examples 6 and 7 were used to prepare color-sealed polyester yarn using a commercial-type melt spinner. By color-sealed polyester yarn is meant polyester yarn wherein the colorant composition is intimately distributed within the body of the polyester fiber. The colored polyethylene terephthalate composition was melted in a screw melter (275°–280° C.), pumped through a transfer line to the injector valve, mixed in-line with molten polyethylene terephthalate and spun in the usual way. The color-sealed polyester yarn thus obtained had excellent physical properties with uniform coloration. Microscopic examination of the fiber showed even distribution of the pigment with the average pigment size in the range of about 0.15 to about 0.3 micron. The following table shows some of the physical properties of the color-sealed polyethylene terephthalate fibers as prepared in this example.

| Pigment | Tenacity (gms./denier) | Elongation, percent |
|---|---|---|
| Blue phthalocyanine | 3.9 | 30.2 |
| Carbon black | 4.5 | 25.3 |
| Orange basic lead chromate | 4.0 | 28.0 |
| Violet phthalocyanine | 4.2 | 26.7 |
| Green phthalocyanine | 4.5 | 25.0 |
| Yellow lead chromate | 3.4 | 28.0 |
| Gold phthalocyanine | 4.8 | 22.8 |
| None (control) | 4.5 | 27.9 |

The foregoing detailed description has been given for clarity of understanding only and no unnecessary limitations are to be understood therefrom. The invention is not limited to exact details shown and described for obvious modifications will occur to one skilled in the art.

What is claimed is:

1. A process for producing a microporous particulate thermoplastic polymer composition comprising:
    (a) mixing a thermoplastic polymer composition, wherein the thermoplastic polymer component of said thermoplastic polymer composition has a solubility of at least 1 weight percent in hexafluoroisopropanol and is further characterized as insoluble in water, with hexafluoroisopropanol,
    (b) contacting a stream of said mixture of thermoplastic polymer composition and hexafluoroisopropanol with a stream of steam, said steam being at a pressure of about 15 to about 135 pounds per square inch absolute,
    (c) adding further liquid water and maintaining the resulting mixture at 60° to 100° C. until residual hexafluoroisopropanol has evaporated and
    (d) recovering the microporous particulate thermoplastic polymer composition.

2. The process of claim 1 wherein said thermoplastic polymer composition is a thermoplastic polymer selected from the group consisting of polyamides, polyesters, polyacrylonitriles and polyacetals.

3. The process of claim 2 wherein said thermoplastic polymer composition is a mixture of said thermoplastic polymers.

4. The process of claim 2 wherein the thermoplastic polymer is poly(ethylene terephthalate).

5. The process of claim 2 wherein the thermoplastic polymer is poly(hexamethylene adipamide).

6. The process of claim 2 wherein the thermoplastic polymer is poly(oxymethylene).

7. The process of claim 1 wherein said thermoplastic polymer composition comprises thermoplastic polymer and an additive in an amount of from about 0.01% to about 60% based on the weight of said thermoplastic polymer.

8. The process of claim 7 wherein said additive is a colorant composition.

9. The process of claim 8 wherein said colorant composition is an organic dye.

10. The process of claim 8 wherein said colorant composition is an organic pigment.

11. The process of claim 8 wherein said colorant composition is an inorganic pigment.

12. The process of claim 7 wherein said additive is an ultra-violet stabilizer.

13. The process of claim 7 wherein said additive is an antioxidant.

14. The process of claim 7 wherein said additive is a plasticizer.

References Cited

UNITED STATES PATENTS

| | | | |
|---|---|---|---|
| 3,408,315 | 10/1968 | Paine | 260—2.5 M |
| 3,450,650 | 6/1969 | Murata | 260—2.5 M |
| 3,418,337 | 12/1968 | Middletown | 260—33.4 R |

SAMUEL H. BLECH, Primary Examiner

M. FOELAK, Assistant Examiner

U.S. Cl X.R.

106—122; 260—23 R, 23 TN, 23 XA, 30.6 R, 30.8 R, 31.8 N, 31.8 R, 31.8 XA, 31.8 F, 31.8 HR, 31.8 G, 33.4 R, 33,4 UR